United States Patent [19]

Takahashi et al.

[11] 3,787,258

[45] Jan. 22, 1974

[54] METHOD AND APPARATUS FOR DEPICTING LETTERS, PATTERNS AND THE LIKE ON SUBSTRATES

[75] Inventors: Tadao Takahashi; Shoji Kitabayashi, both of Tokyo, Japan

[73] Assignee: Iwatsu Electric Company Limited, Tokyo, Japan

[22] Filed: Sept. 18, 1969

[21] Appl. No.: 859,052

[30] Foreign Application Priority Data

Sept. 24, 1968 Japan .............................. 43-68233

[52] U.S. Cl. .............................. 156/73, 29/470.3

[51] Int. Cl. .............................. B32b 31/16

[58] Field of Search... 156/73, 580; 228/1; 29/470.3

[56] References Cited

UNITED STATES PATENTS

| | | | |
|---|---|---|---|
| 2,307,424 | 1/1943 | Savage | 156/73 |
| 3,222,235 | 12/1965 | Buchner | 156/73 |
| 3,602,420 | 8/1971 | Wilkinson | 156/73 |
| 3,657,033 | 4/1972 | Sager | 156/73 |

*Primary Examiner*—Douglas J. Drummond

*Attorney, Agent, or Firm*—Chittick, Pfund, Birch, Samuels and Gauthier

[57] ABSTRACT

Apparatus for depicting letters or patterns on the surface of a substrate with a metal foil comprises a vibrator energized by a current of supersonic frequency, and a pointed amplitude magnifying horn secured to the vibrator. To depict letters or patterns, a metal foil is placed on either side of the substrate, the horn is urged under slight pressure against the surface of the metal foil or substrate and the vibrator is moved by hand in the X and Y directions to depict letters or patterns whereby portions of the metal foil are separated and are firmly adhered to the surface of the substrate.

4 Claims, 2 Drawing Figures

PATENTED JAN 22 1974

3,787,258

INVENTORS
TADAO TAKAHASHI
SHOJI KITABAYASHI

BY Chittick, Pfund, Birch
Samuels & Gauthier
ATTORNEY

METHOD AND APPARATUS FOR DEPICTING LETTERS, PATTERNS AND THE LIKE ON SUBSTRATES

BACKGROUND OF THE INVENTION

This invention relates to a novel method and apparatus for depicting letters, patterns and the like by adhering metal foils on substrates by means of ultrasonic vibrations.

Heretobefore, such letters or patterns were depicted on substrates such as papers and clothes by applying metal foils on one surface of the substrates and then strongly pressing the metal foils against the substrates with writing instruments or printing types. However, such method is low speed and consumes much labor and time.

SUMMARY OF THE INVENTION

It is therefore an object of this invention to provide a novel method and apparatus which can rapidly and readily depict letters, patterns and the like of any desired configuration by adhering metal foils on substrates.

In accordance with this invention there is provided an apparatus comprising a magnetostrictive vibrator, an energizing coil for the vibrator, means for exciting the coil with a current of supersonic frequency, an amplitude magnifying horn fixed to the vibrator, and a casing to support the horn at its nodal point of vibration. To depict letters or patterns on the surface of a substrate, a metal foil is placed on either side of the substrate, the tip of the horn is urged under slight pressure against the surface of the metal foil or substrate and the vibrator is moved by hand in the X and Y directions to depict letters or patterns whereby portions of the metal foil are separated and are firmly adhered to the surface of the substrate to depict well defined letters or patterns.

DESCRIPTION OF THE PREFERRED EMBODIMENT

Figure 1:
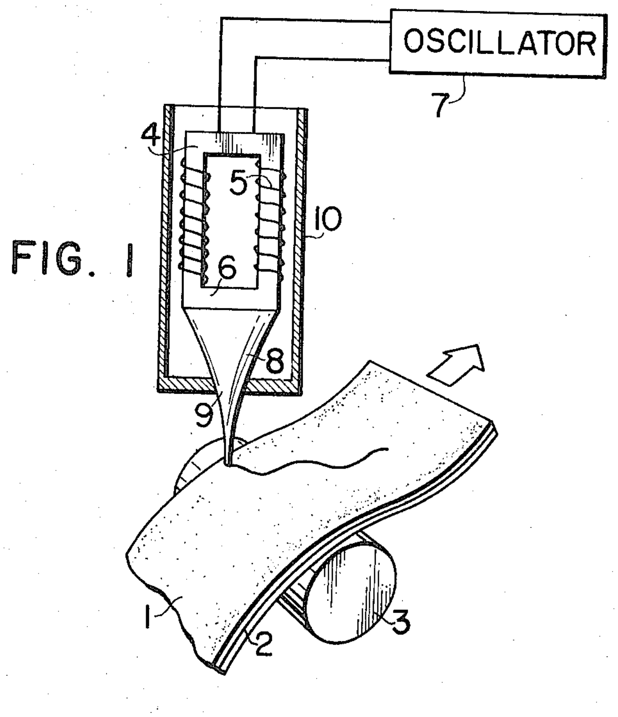
FIG. 1 is a diagrammatic representation, partly in section, of the depicting apparatus embodying this invention
Figure 2:
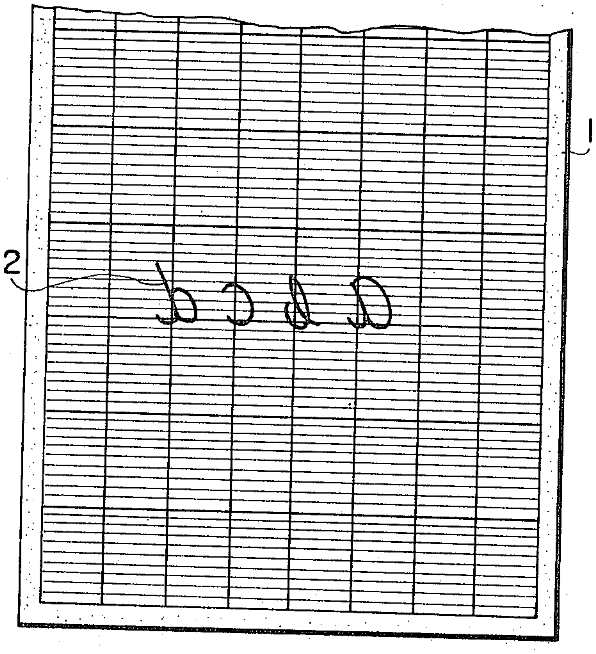
FIG. 2 is a rear view of a paper on which letters have been depicted in accordance with this invention.

Referring now to FIG. 1 of the accompanying drawing a substrate 1, paper in this example, is advanced in the direction of an arrow partly around the periphery of a roller 3. A thin foil of metal 2, such as aluminum or copper is placed along one surface of the substrate 1. Although, in this example the metal foil 2 is shown on the rear side of the substrate 1, if desired, the metal foil 2 may be interposed between two substrates. Above the roller 3 is disposed a magnetostrictive vibrator 6 comprising a core 4 of a magnetostrictive material or ferrate and a coil 5 wound upon the core. The coil is energized by a high frequency oscillator 7. An amplitude magnifying horn 8 is secured to one end of the core 4 with its node of vibration 9 secured to a casing 10 containing the vibrator 6. The lower end of the amplitude magnifying horn 8 is pointed like a pencil, or as shown in the drawing.

While energizing the vibrator 6 with a current of supersonic frequency the casing 10 is held by a hand of an operator and the free end of the amplitude amplifying horn is pressed against the surface of the substrate 1 under a slight pressure. By moving the horn in X and Y directions, letters or patterns of any desired configuration can be depicted.

As has been pointed out, according to the prior art method wherein a metal foil is placed on the front or rear side of a paper, and letters or patterns are depicted by pressing and moving a writing instrument of metal, it is not easy to securely adhere the metal foil on the surface of the paper. In addition, the movement of the writing instrument is sluggish so that clear and well defined letters or patterns could not be obtained. According to one example of this invention, an energizing current having a supersonic frequency was supplied to the vibrator 6 from the high frequency oscillator 7 having an output of 50 watts to create in the amplitude magnifying horn 8 a high frequency vibration in the supersonic band. An aluminum foil of 0.05mm thick was placed on the rear side of a sheet of paper of 0.1 to 1mm thick. By urging the free end of the horn under slight pressure against the surface of the paper while it is moved over the roller 8, and by manipulating the casing in the X and Y directions, portions of the aluminum foil contacted by the horn were securely adhered to the back of the paper thus producing clear and well defined letters. Since the horn is vibrated at a high frequency, it can smoothly move over the surface of the paper to readily depict letters.

It is believed that this was caused by the separation of the surface layer of the aluminum foil from the remaining portion thereof and the separated surface layer of aluminum was caused to firmly adhere to the surface of the paper due to heat generated by the supersonic vibration of the horn 8.

Although the physical dimension of the tip of horn 8 is determined dependent upon the width of the line to be depicted, it is advantageous to shape the tip to have a rounded configuration of a radius of curvature of several millimeters or less.

The substrate depicted with letters or patterns with metal foils in accordance with this invention are suitable for books, paper articles or other ornamental purposes. However, when the substrate is used for automatic read out devices constituting one of the terminal devices of electronic computors, such letters or patterns can be read electrically thus simplifying the read out devices compared to prior art photoelectric read out devices.

Thus, according to this invention, by merely changing the diameter of the tip of the horn 8, letters or patterns of metal foils can be readily depicted with thick or thin lines. Moreover, the high frequency vibration of the horn assures firm adhesion of metal foils to the substrate so that well defined letters or patterns can be depicted.

What is claimed is:

1. A method of depicting letters or patterns on the surface of a substrate with a metal foil, comprising the steps of placing a metal foil on one surface of a substrate, supporting the assembled substrate and foil, urging under slight pressure against a surface of said assembled substrate and foil the tip of an amplitude magnifying horn connected to a high frequency vibrator energized by an exciting current of supersonic frequency and moving said high frequency vibrator in X and Y directions across and in contact with said surface of said assembled substrate and foil to depict said letters or patterns, the vibration of said horn separating surface portions of said metal foil only beneath said tip, transferring same and firmly surface bonding said separated portions only beneath said tip to a surface of said substrate.

2. The method of depicting letters or patterns according to claim 1 wherein said metal foil is placed on the front surface of said substrate and said vibrating horn is urged against said metal foil.

3. The method of depicting letters or patterns according to claim 1 wherein said metal foil is placed on the rear side of said substrate and said vibrating horn is urged against the front surface of said substrate.

4. The method of depicting letters or patterns according to claim 1 wherein said metal foil is sandwitched between a pair of substrates.

* * * * *